US007885060B2

United States Patent
Douglas et al.

(10) Patent No.: US 7,885,060 B2
(45) Date of Patent: Feb. 8, 2011

(54) AUXILIARY DISPLAY SYSTEMS AND METHODS

(75) Inventors: David W. Douglas, Austin, TX (US); Shree Dandekar, Round Rock, TX (US); Kevin Blane Enders, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 284 days.

(21) Appl. No.: 12/189,769

(22) Filed: Aug. 11, 2008

(65) Prior Publication Data

US 2010/0033916 A1    Feb. 11, 2010

(51) Int. Cl.
   *G06F 1/16*    (2006.01)
(52) U.S. Cl. .................. 361/679.21; 235/492; 455/566; 345/173
(58) Field of Classification Search ................ 235/492; 455/566; 345/1.1, 166, 173; 713/320; 361/679.27, 361/679.04, 679.05, 679.06, 679.21, 679.28, 361/679.29
See application file for complete search history.

(56) References Cited

U.S. PATENT DOCUMENTS

| 6,845,455 | B2 | 1/2005 | Kavanaugh et al. | |
|---|---|---|---|---|
| 6,863,219 | B1 * | 3/2005 | Jacobsen et al. | 235/492 |
| 7,277,275 | B2 | 10/2007 | Won et al. | |
| 2005/0182980 | A1 | 8/2005 | Sutardja | |
| 2005/0259072 | A1 * | 11/2005 | Sato | 345/156 |
| 2006/0238439 | A1 | 10/2006 | Fuller et al. | |
| 2006/0250320 | A1 | 11/2006 | Fuller et al. | |
| 2009/0122019 | A1 * | 5/2009 | Lin et al. | 345/173 |
| 2010/0093401 | A1 * | 4/2010 | Moran et al. | 455/566 |

\* cited by examiner

*Primary Examiner*—Hung V Duong
(74) *Attorney, Agent, or Firm*—Garrana Tran LLP (57) ABSTRACT

A portable information handling system (IHS) is disclosed wherein the system includes a cover, a primary display disposed on the cover and an auxiliary display coupled to the cover, wherein the auxiliary display is movable between a viewable position and a closed position. The system also includes a switch coupled to the auxiliary display, wherein the switch is adapted to place the auxiliary display in an operational state in the open position and in a non-operational state in the closed position.

21 Claims, 9 Drawing Sheets

AUXILIARY DISPLAY SYSTEMS AND METHODS

BACKGROUND

1. Technical Field

The present disclosure relates generally to the field of information handling systems, and more specifically, to auxiliary displays for portable information handling systems.

2. Background Information

As the value and use of information continues to increase, individuals and businesses seek additional ways to process and store information. One option available to users is an information handling system (IHS). An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for such systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An IHS may be provided in a portable housing and may be capable of operating on battery power to allow the IHS to be easily transportable. For example, portable IHSs may include a laptop, a handheld, a cellular phone, a PDA, a MP3 player, or the like. A laptop may generally provide the same functionality as a desktop computer in a portable housing that allows a user to perform mobile computing.

A laptop may include a cover with a display and a base housing several components. Some operating systems may enable an IHS to operate an auxiliary display device connected to the IHS. In some implementations of laptops, an auxiliary display may be incorporated into the housing of the laptop. The auxiliary display may allow a user to access information (e.g., emails, calendars, contacts) when the laptop is in a standby/hibernation mode or in a closed position. The auxiliary display may be integrated into the cover or another location on the laptop. For instance, the auxiliary display may be oriented in a upward facing position on the cover of a laptop which may allow the auxiliary display to be viewable when the laptop cover is closed. However, with the viewable side of the display exposed, the auxiliary display may be susceptible to damage. Further, while the auxiliary display may be visible when a laptop is in a closed position, a user's viewing angle may impair visual quality. Since typically an auxiliary display is fixed within the cover of a laptop, the entire laptop may have to be moved to improve the viewing angle. Thus, a need exists for improved methods, apparatus, and systems for providing an auxiliary display to be utilized with a portable IHS.

SUMMARY

The following presents a general summary of several aspects of the disclosure in order to provide a basic understanding of at least some aspects of the disclosure. This summary is not an extensive overview of the disclosure. It is not intended to identify key or critical elements of the disclosure or to delineate the scope of the claims. The following summary merely presents some concepts of the disclosure in a general form as a prelude to the more detailed description that follows.

One aspect of the disclosure is a portable information handling system that includes a cover, a primary display disposed on the cover and an auxiliary display coupled to the cover, wherein the auxiliary display is movable between a viewable position and a closed position. The system also includes a switch coupled to the auxiliary display, wherein the switch is adapted to place the auxiliary display in an operational state in the open position and in a non-operational state in the closed position.

Another aspect of the disclosure is a card for displaying data on a portable information handling system (IHS), wherein the card provides an auxiliary display disposed on the card. A connector is also provided by the card, wherein the connector is adapted to couple the card to the portable IHS and a processor is coupled to the display, wherein the processor manages data to be displayed.

Yet another aspect of the disclosure is a method for providing data on an auxiliary display of a portable information handling system (IHS) which provides coupling the auxiliary display to the portable IHS, wherein the portable IHS communicates data to the auxiliary display.

BRIEF DESCRIPTION OF THE DRAWINGS

For simplicity and clarity of illustration, the drawing and/or figures illustrate the general manner of construction of a portable information handling system and components thereof. Descriptions and details of well known features and techniques may be omitted to avoid unnecessarily obscuring the disclosure.

For detailed understanding of the present disclosure, references should be made to the following detailed description of the several aspects, taken in conjunction with the accompanying drawings, in which like elements have been given like numerals and wherein.

DETAILED DESCRIPTION

Before the present systems and methods are described, it is to be understood that this disclosure is not limited to the particular systems and methods described, as such may vary. One of ordinary skill in the art should understand that the terminology used herein is for the purpose of describing possible aspects, embodiments and/or implementations only, and is not intended to limit the scope of the present disclosure which will be limited only by the appended claims.

It must also be noted that as used herein and in the appended claims, the singular forms "a," "and," and "the" may include plural referents unless the context clearly dictates otherwise. Thus, for example, reference to "a display" may refer to one or more displays, and reference to "a method of providing" includes reference to equivalent steps and methods known to those skilled in the art, and so forth.

For purposes of this disclosure, an embodiment of an Information Handling System (IHS) may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a personal computer, a storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit data communications between the various hardware components.

Figure 1:
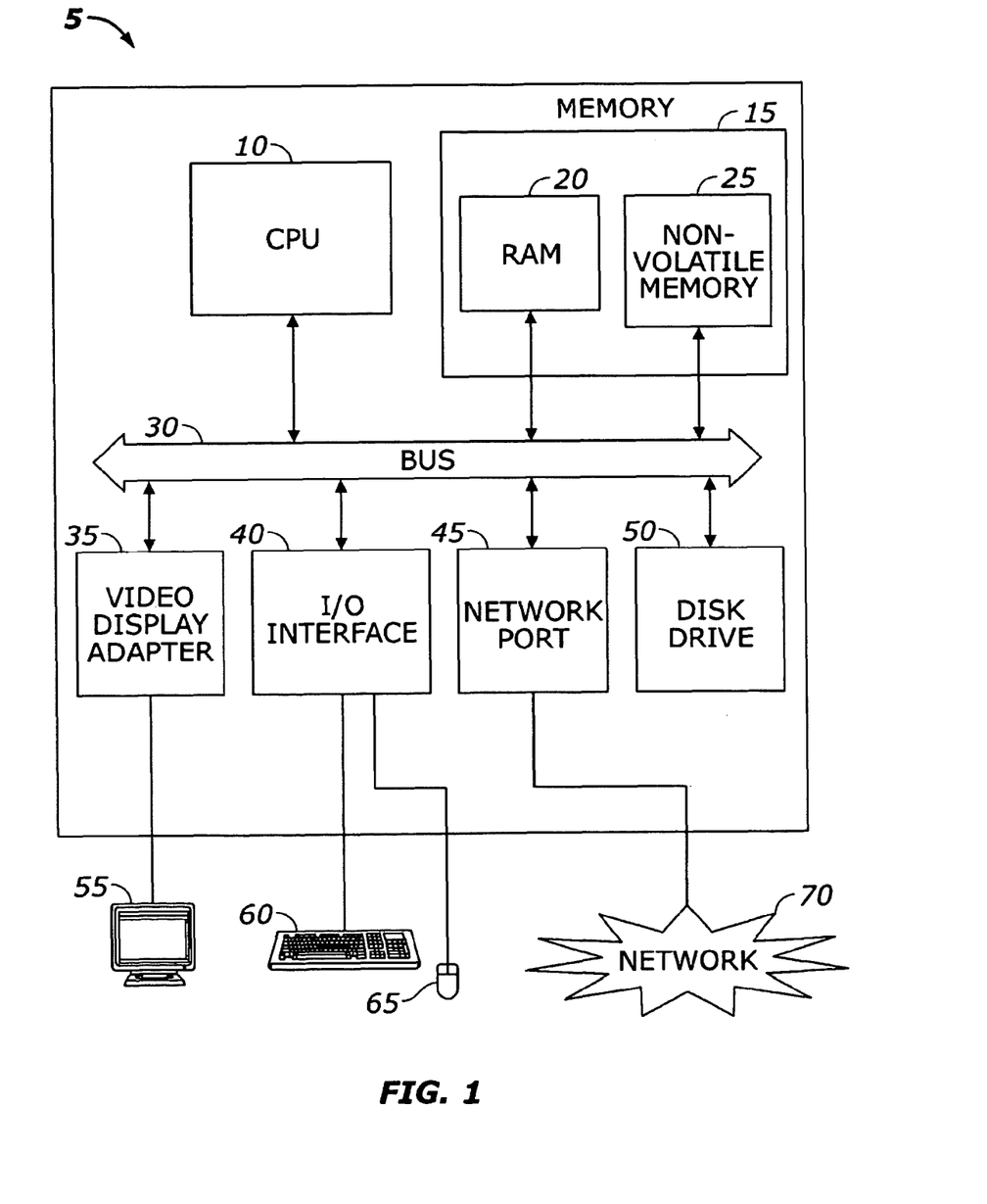
FIG. 1 represents an illustrative implementation of an information handling system (IHS)

FIG. 1 illustrates one possible implementation of an IHS 5 comprising a CPU 10. It should be understood that the present disclosure has applicability to IHSs as broadly described above, and is not intended to be limited to the IHS 5 as specifically described. The CPU 10 or controller may comprise a processor, a microprocessor, minicomputer, or any other suitable device, including combinations and/or a plurality thereof, for executing programmed instructions. It is appreciated that execution of the algorithm to be described below occurs in the processor or the CPU 10. The CPU 10 may be in data communication over a local interface bus 30 with components including memory 15 and input/output interfaces 40. The memory 15, as illustrated, may include non-volatile memory 25. The non-volatile memory 25 may include, but is not limited to, flash memory, non-volatile random access memory (NVRAM), and electrically erasable programmable read-only memory (EEPROM). The non-volatile memory 25 may contain a firmware program (not shown) which may contain programming and/or executable instructions required to control a keyboard 60, mouse 65, video display 55 and/or other input/output devices not shown here. This type of firmware may be known as a basic input/output system (BIOS). The memory may also comprise random access memory (RAM) 20. The operating system and application programs (e.g., graphical user interfaces) may be loaded into the RAM 20 for execution.

The IHS 5 may be implemented with a network port 45 to permit communication over a network 70 such as a local area network (LAN), personal area network (PAN) or a wide area network (WAN), such as the Internet. As understood by those skilled in the art, IHS 5 implementations may also include an assortment of ports and interfaces for different peripherals and components, such as video display adapters 35, disk drives port 50, and input/output interfaces 40 (e.g., keyboard 60, mouse 65).

Figure 2:
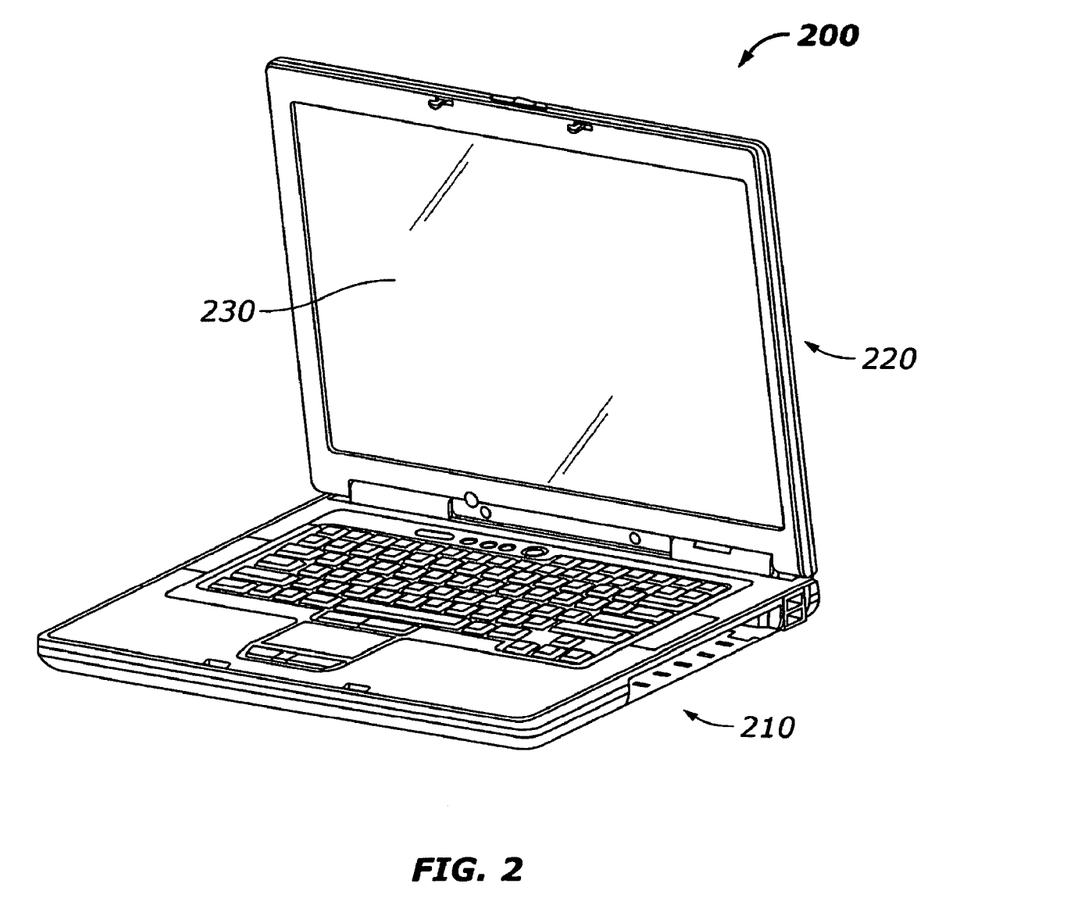
FIG. 2 represents an illustrative implementation of a portable IHS.

FIG. 2 represents an illustrative implementation of a portable IHS indicated generally at 200. The portable IHS 200 may include a base 210 and a cover 220 with a primary display 230 disposed thereon. The base 210 may house several components of the portable IHS, including, but not limited to, a motherboard, CPU, memory, any of the above-mentioned components or components that may be present in an IHS. As shown, the cover 220 may reveal a primary display 230 when the portable IHS 200 is in an open position. When the portable IHS 200 is in closed position, the primary display 230 may be in a downward facing position on the base 210 and not be visible. In some situations, a user may not have a need to utilize the primary display 240 or the primary display 240 may be difficult or inconvenient to access. For instance, an IHS may be in standby mode requiring the user to wait until the IHS returns to a normal operating mode. In one possible scenario, a user may be in a situation such as a meeting where it difficult to operate an IHS without distracting others. In these situations as well as others when access to the primary display 230 is difficult or inconvenient, a user may prefer to use a secondary or auxiliary display.

An auxiliary display, possibly a smaller display than the primary display, may be provided in a suitable portion of the portable IHS or may be coupled to the portable IHS. For instance, an auxiliary display may be incorporated as part of the cover, palm rest, or any other suitable area of the portable IHS. Alternatively, the auxiliary display may be a removable component that may be coupled to an IHS utilizing a port or connector, such as a Peripheral Component Interconnect (PCI) mini card, PCI Express Card, Universal Serial Bus (USB) or another suitable port. In some implementations, the auxiliary display may be communicatively coupled (e.g., via wireless connection) to an IHS utilizing Bluetooth, infrared (IR) signals, radio frequency (RF) signals, Wi-Fi, or the like. The auxiliary display would provide viewing of information that would typically be provided by the primary display including, but not limited to, emails, calendars and the like.

As discussed previously, use of the auxiliary display may be preferred over the primary display in some situations. For instance, in a meeting it may be desirable for a user to receive session initiation protocol/voice over internet protocol (VoIP) calls, alerts, instant messages, and/or notices through the auxiliary display so as to not distract others. An application, such as Microsoft SideShow, may allow an auxiliary display to be utilized for a portable IHS. An auxiliary display may cache data from the IHS to allow a user to read emails, review a calendar, view photos/videos, listen to music, receive directions, and perform various additional tasks on the auxiliary display. The application may allow the auxiliary display to receive various notices or alerts, such as incoming VoIP calls, meeting reminders, new email, instant messages, and the like. The auxiliary display may also be capable of stream network content from the portable IHS. The auxiliary display may include a digital video broadcast handheld (DVB-H) antenna to allow streaming television content to be received. Further, the auxiliary display may be detachable from a portable IHS, which may allow the auxiliary display to operate as a portable handheld device. While several features of the application utilized to manage communication between an auxiliary display and the portable IHS are discussed herein, the features of the application and the scope of the claims are in no way limited to the specific features discussed. An application allowing an auxiliary display to be utilized with an IHS may provide significant flexibility in the tasks that may be performed on the auxiliary display.

Figure 3A:
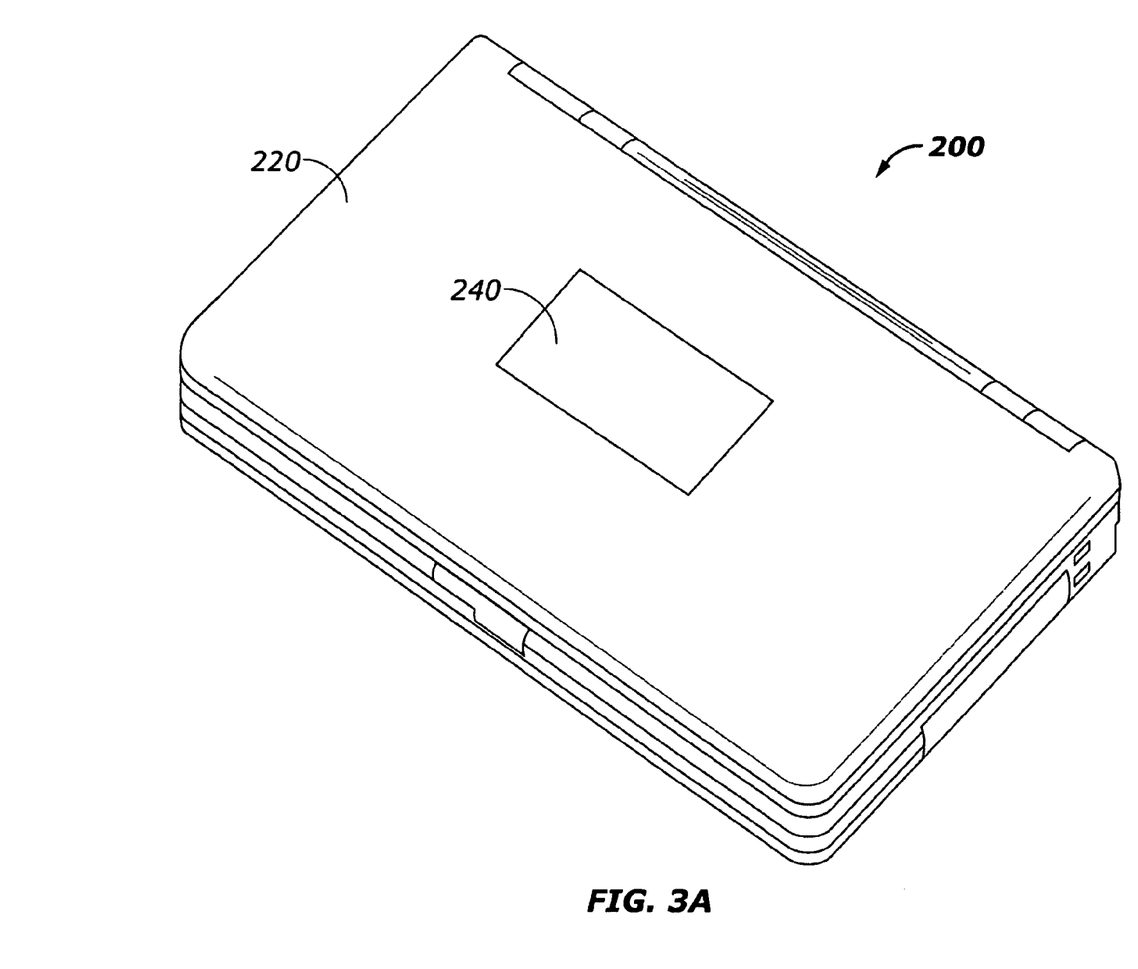
FIG. 3A represents an illustrative implementation of a portable IHS with an auxiliary display in a closed position.

FIG. 3A represents an illustrative implementation of a portable IHS 200 with an auxiliary display in a closed position. When a cover 220 of a portable IHS 200 is closed or the primary display (not shown) is in a downward facing position, an auxiliary display 240 on the cover 220 of the portable IHS 200 may be utilized. The viewable side of the auxiliary display 240 may also be downward facing in a closed position to protect the auxiliary display 240 from damage. The viewable side of the auxiliary display 240 may provide a flat panel display, such as a thin film transistor-liquid crystal display (TFT-LCD) or other liquid crystal display (LCD), an organic light emitting diode (OLED) display, an electrophoretic or cholesteric liquid crystal (i.e., e-paper) display, or any other suitable type of flat panel display. While the auxiliary display 240 is shown substantially in the center of the cover 220, in other implementations, the auxiliary display 240 may be provided in a variety of locations on the portable IHS 200 or may be coupled to the portable IHS 200 as discussed previously.

The viewable side of the auxiliary display may be exposed by moving (e.g., lifting, rotating) the auxiliary display into a viewable position to allow the auxiliary display to be viewed by a user. For instance, in the implementations discussed herein, the auxiliary display may be flipped up at approximately a 90 degree angle to the cover or to assume a substantially perpendicular position relative to the cover. In some implementations, the auxiliary display may be further manipulated so that the auxiliary display may be in a viewable position while placed flat on top of the cover. While several implementations may be discussed herein, the scope of the invention is in no way limited to the particular implementations discussed herein. Several alternative means may be utilized to allow the auxiliary display to be movable between the closed and viewable positions in addition to the implementations discussed herein.

Figure 3B:
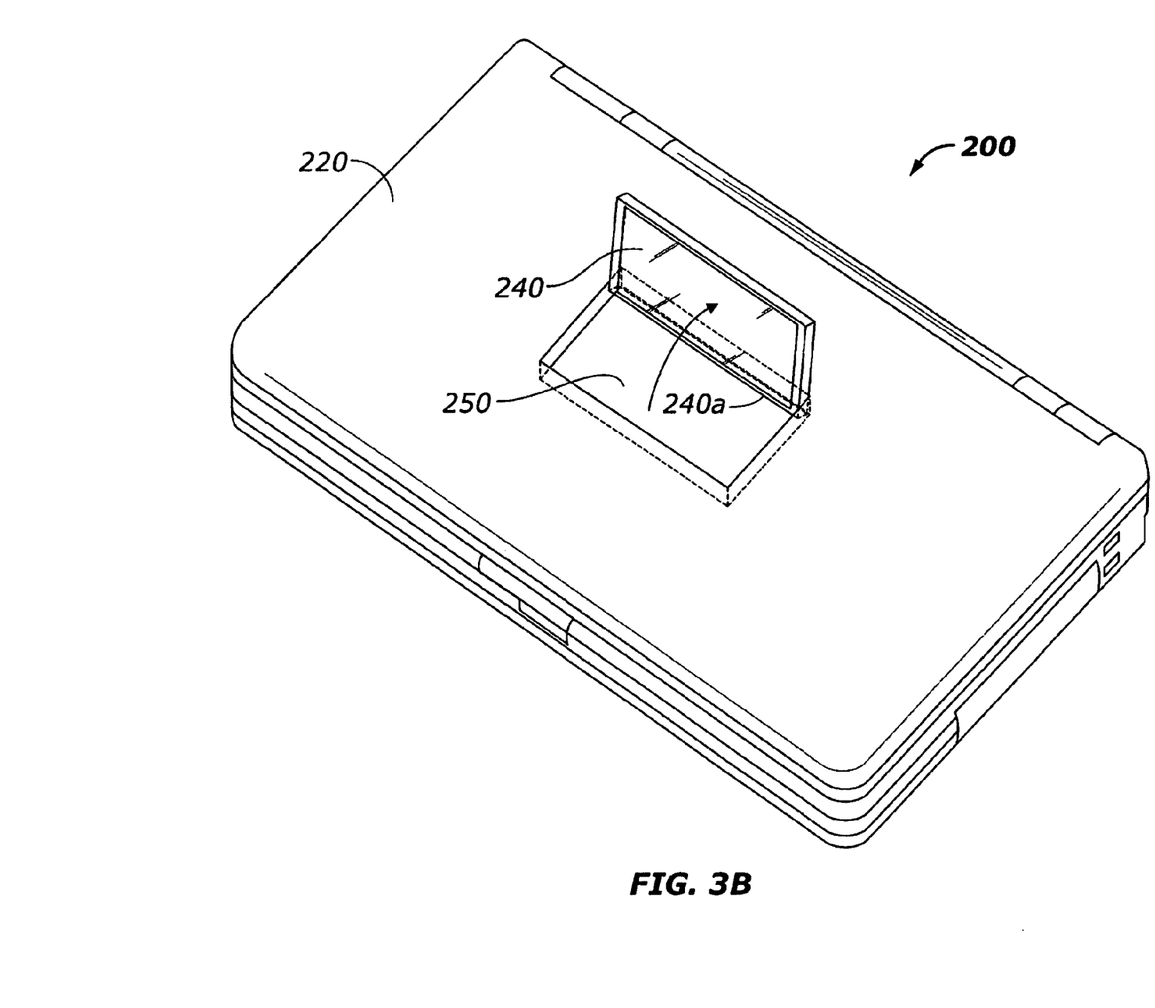
FIG. 3B represents a first illustrative implementation of a portable IHS with an auxiliary display in an open position.

FIG. 3B represents an implementation of a portable IHS 200 with an auxiliary display 240 in an open position. An auxiliary display 240 may flip-up (i.e., pivot or rotate on one edge) from the cover 220 of the portable IHS 200 into a viewable position. Two edges of the auxiliary display 240 may include a protruding pivot point (discussed below) that fits into the display slot 250 disposed on the cover 220. As shown, the auxiliary display 240 may rotate along a pivot edge 240a into a viewable position so that the display 240 is substantially perpendicular (e.g., vertical or at 90 degrees) to the cover 220. By placing the auxiliary display 240 into a substantially vertical position relative to the cover 220, the viewing angle may be significantly improved.

Figure 3C:
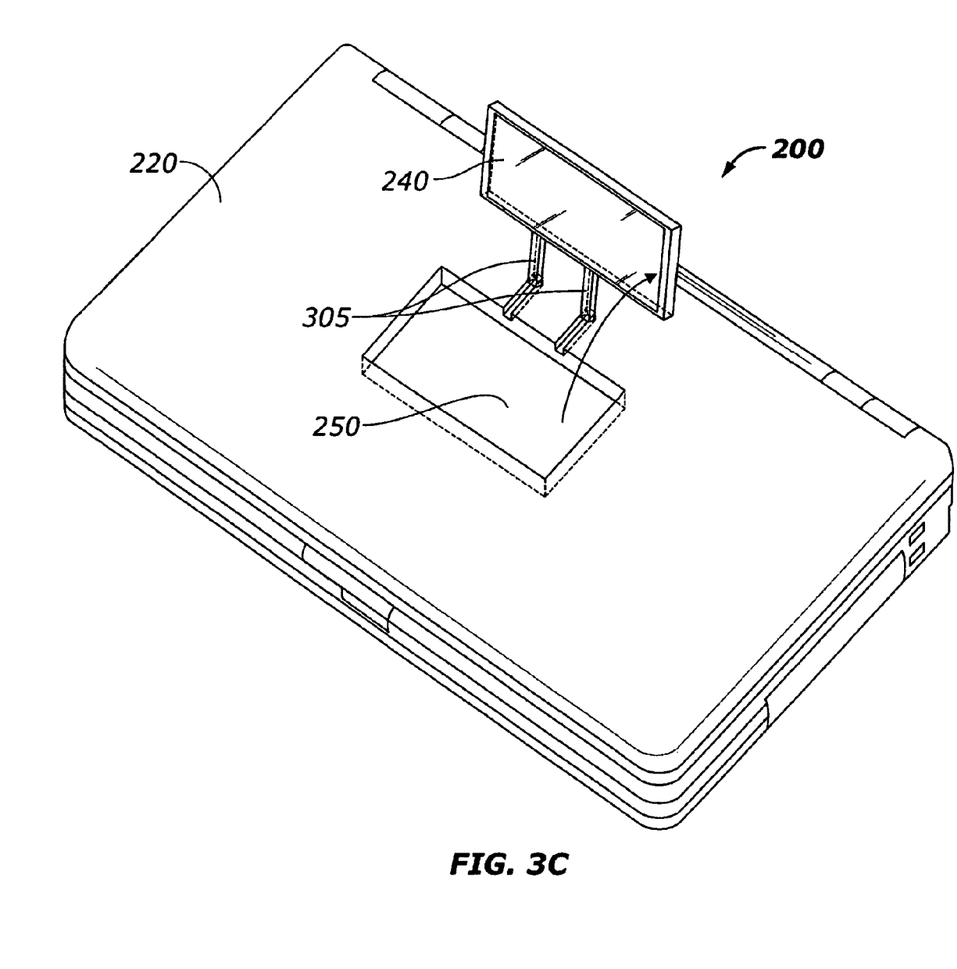
FIG. 3C represents a second illustrative implementation of a portable IHS with an auxiliary display in an open position.

FIG. 3C represents another implementation of a portable IHS 200 with an auxiliary display 240 in an open position. An auxiliary display 240 may be lifted or flipped up out of the display slot 250 so that a viewable side is exposed, as in the previous implementation. Further, the auxiliary display 240 may be coupled to the cover 220 of a portable IHS 200 via one implementation of an arm, shown in FIG. 3C as a flexing arm 305. One or more flexing arms 305 may be formed of any suitable material, such as plastic or the like, to allow flexion and/or rotation along a hinge or joint (not shown). The flexing arms 305 may allow the auxiliary display 240 to rotate into a substantially vertical or perpendicular position relative to the cover 220, thus enabling a user to view the auxiliary display 240 from varying viewing angles. The flexing arms 305 may also allow the auxiliary display 240 to be raised to a specified height above the cover 220, according to the preference of a user. Thus, the current implementation may allow the auxiliary display 240 to assume a higher viewing position than in other implementations.

Figure 3D:
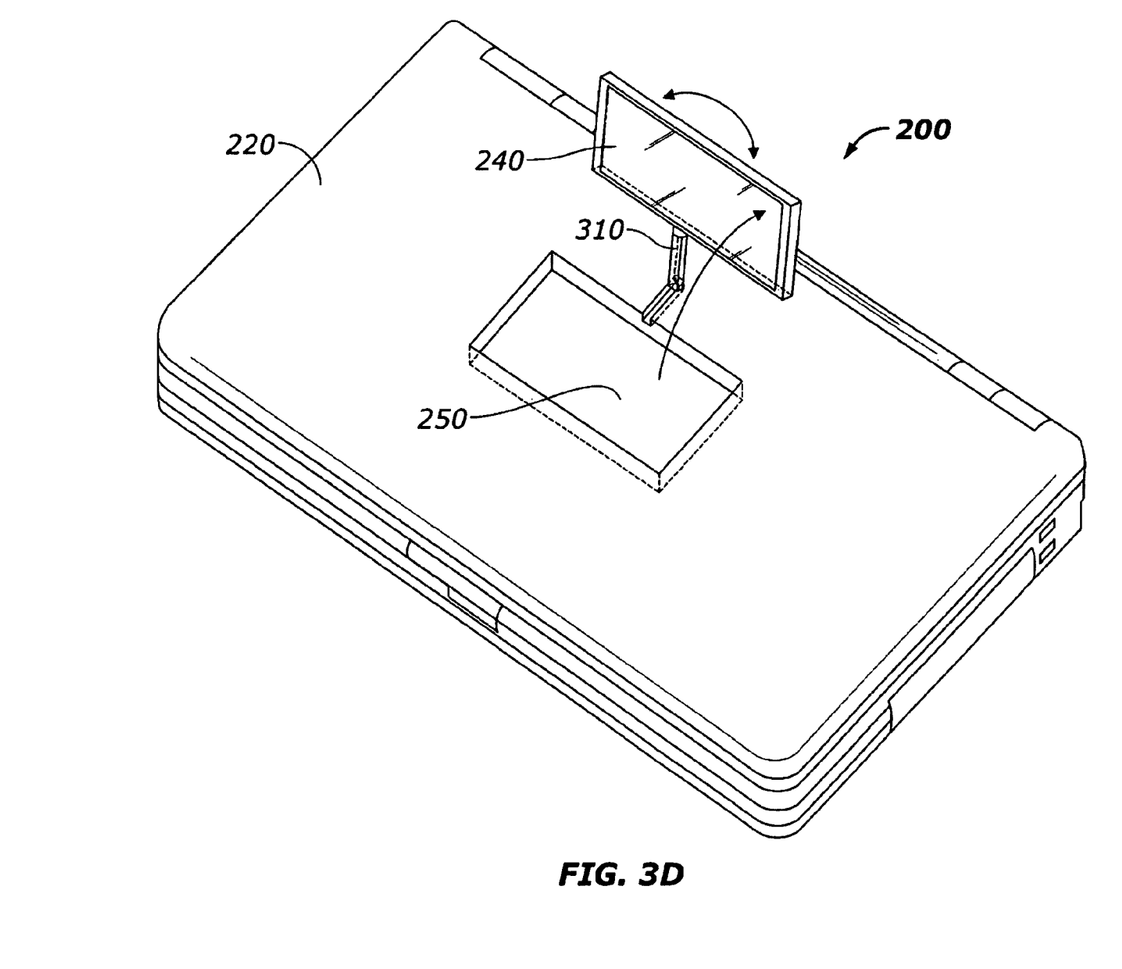
FIG. 3D represents a third illustrative implementation of a portable IHS with an auxiliary display in an open position.

Referring now to FIG. 3D, which represents yet another implementation of a portable IHS 200 with an auxiliary display 240 in an open position. In the current implementation, the auxiliary display 240 may be lifted up from the display slot 250 to expose the viewable side of the auxiliary display 240. As in the previous implementation, the auxiliary display 240 may be raised in height to a viewable position higher than in other implementations. Once the auxiliary display 240 is lifted to the viewable position, the auxiliary display may be rotated or pivoted about another implementation of an arm, shown as a rotating arm 310 coupled to the cover 220. For instance, the auxiliary display 240 may be lifted up away from the cover 220 and rotated 180° about the arm rotating arm 310. Further, the auxiliary display 240 may then be placed down into the display slot 250 so that the viewable side is in an upward facing position and the auxiliary display 240 is flush with the cover 220.

Figure 3E:
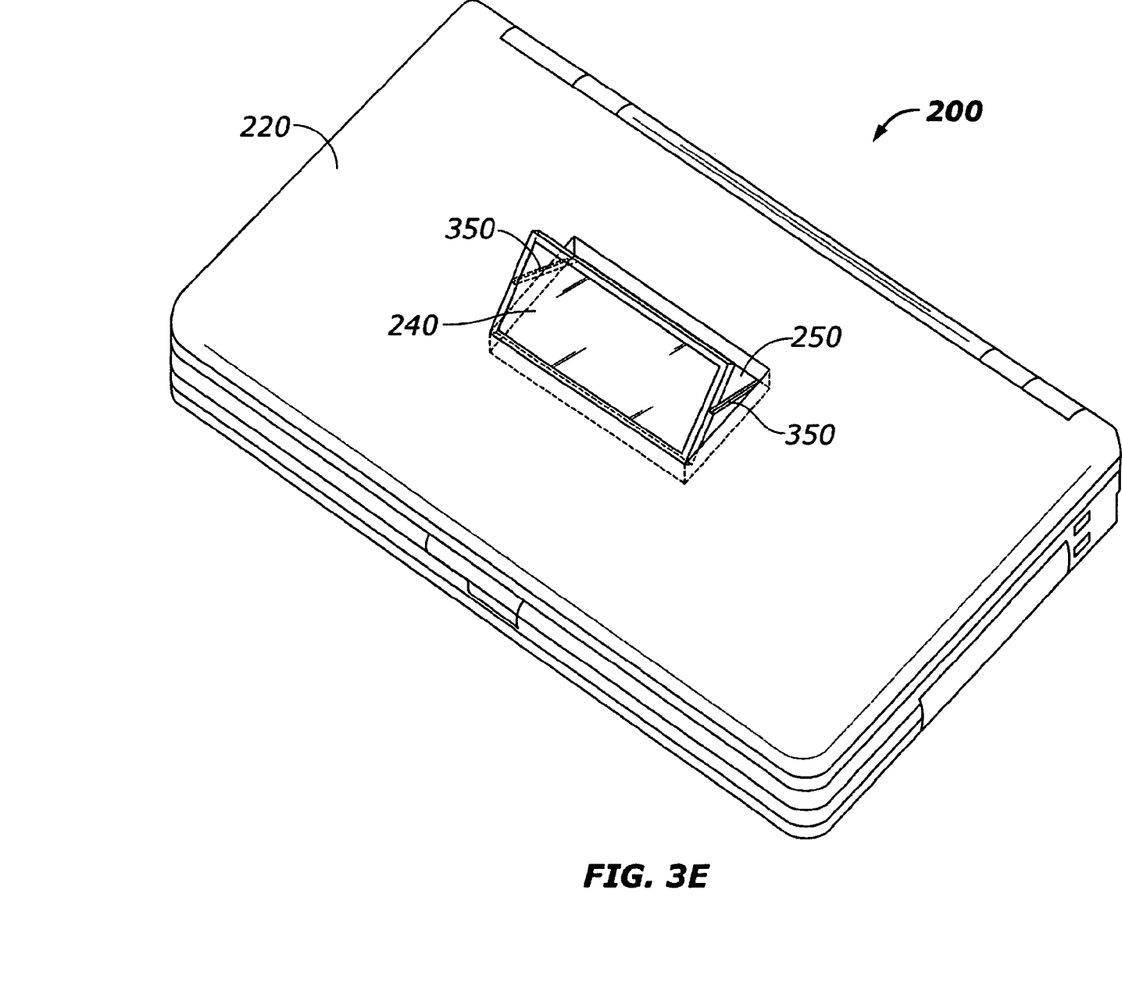
FIG. 3E represents a fourth illustrative implementation of a portable IHS with an auxiliary display in an open position.

FIG. 3E represents still another illustrative implementation of a portable IHS 200 with an auxiliary display 240 in an open position. As shown, the auxiliary display 240 may be capable of being rotated about a pivot point created by yet another implementation of an arm indicated as pivot arms 350 coming out of the auxiliary display slot 250. The pivot arms 350 may attach the auxiliary display 240 to the cover 220 of a portable IHS 200. When the auxiliary display 240 is in a closed position, the viewable side of the auxiliary display 240 may be protected or may be in a downward facing position within the display slot 250. The pivot arms 350 may allow the auxiliary display 240 to be lifted and rotated 360° by the user. The auxiliary display may rotate about an axis that is created by attachment/pivot points discussed in detail below. By way of example, the auxiliary display 240 may be rotated approximately 90° and propped up against the pivot arms 350 into viewable position. Additionally, the auxiliary display 240 may be rotated an additional 90° or 180° total so that the auxiliary display 240 is placed flush within the display slot 250 with the viewable side in an upward facing position.

Figure 4:
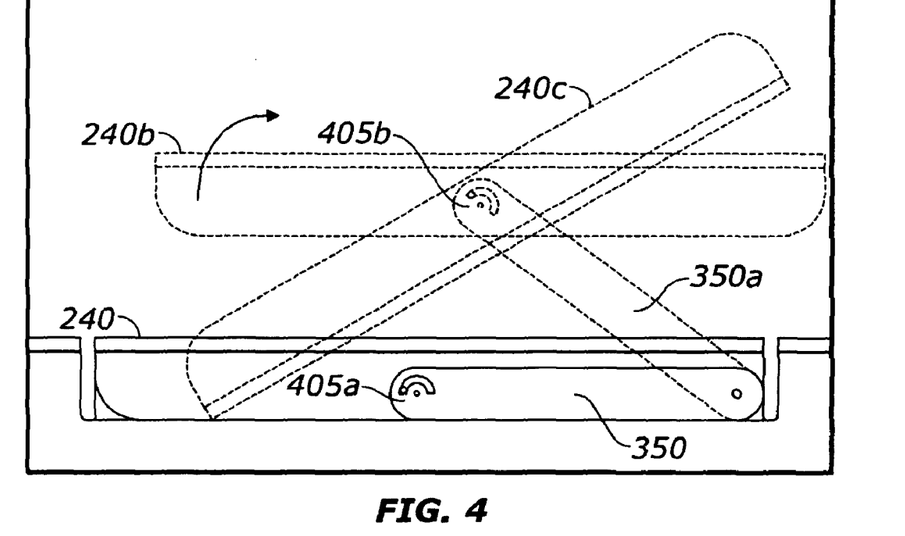
FIG. 4 provides a side view of an illustrative implementation of a portable IHS with an auxiliary display in an open position.

Referring now to FIG. 4, a side view is provided of a portable IHS with an auxiliary display in an open position. Similar to the previous implementation mentioned above, an auxiliary display may be attached to a cover of a portable IHS utilizing pivot arms. The pivot arms may attach to the side edges of the auxiliary display to allow the display to rotate about an axis created by the pivot points 405, 410 coupling the pivot arms to the auxiliary display. When the auxiliary display is in a closed position 240a, the viewable side of the auxiliary display may be protected or may be in a downward facing position against the cover 220. When a user wishes to view the auxiliary display, he may lift it to a second position 240b, which is in between a viewable position 240c and closed position 240a. As the auxiliary display is lifted, it may be rotated into a viewable position 240c so that the viewable side of the auxiliary display is exposed. The user may prop up the auxiliary display against the pivot arm or the auxiliary display may be rotated 180° so that it is flush with the cover.

Figure 5:
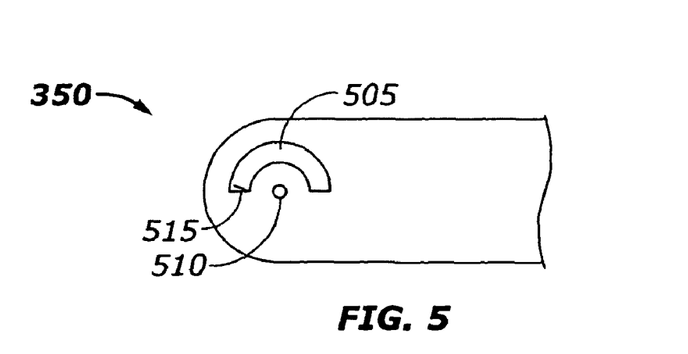
FIG. 5 provides a magnified side view of an illustrative implementation of an auxiliary display arm.

FIG. 5 provides a magnified side view of one implementation of an auxiliary display arm indicated generally at 350. The auxiliary display arm 350 may be utilized to couple an auxiliary display to the cover of a portable IHS. An auxiliary display arm 350 may provide a recessed track 505, a protruding pivot 510 and an on/off switch 515 that are utilized to secure and control the powering of the auxiliary display. An auxiliary display arm 350 may be coupled to each side of the auxiliary display. The recessed track 505 may receive a track pin (not shown) located on the auxiliary display and guide the rotation of the display about pivot points created by the protruding pivot 510. In the implementation shown, the recessed track 505 may allow the auxiliary display to rotate up to 180° about the protruding pivot 510. However, in other implementations, the recessed track 505 may allow the auxiliary display to rotate more or less than 180°. The protruding pivot 510 may be inserted into a recessed pivot (not shown) on the auxiliary display to create a pivot point. The auxiliary display may rotate about an axis of the pivot point or the protruding pivot 510 on the auxiliary display arm 350. An on/off switch 515 in the recessed track 505 may be utilized to switch the auxiliary display on and off depending upon the position of the auxiliary display, which will be discussed in detail below.

Figure 6:
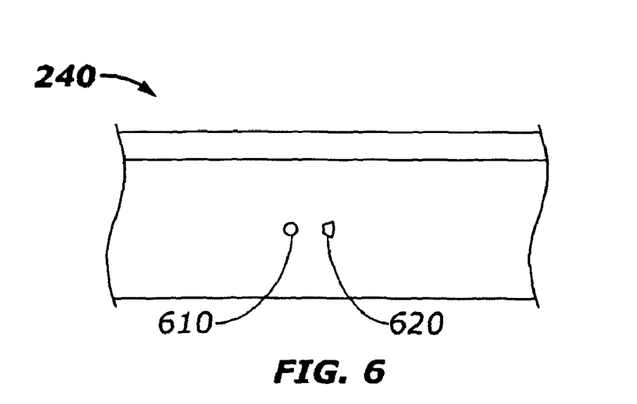
FIG. 6 provides a magnified view of a pivot and tracking pin of the auxiliary display arm in FIG. 5.

Referring now to FIG. 6, a magnified view of a pivot and tracking pin of an auxiliary display arm in FIG. 5 is shown. Each side of the auxiliary display 240 may provide a recessed pivot 610 for receiving the protruding pivot from the arms to create a pivot point for the auxiliary display 240. The protruding pivot couples the auxiliary display 240 to the arms and allows the auxiliary display 240 to rotate about an axis defined by the pivot point. The auxiliary display 240 may include a protruding track pin 620 that fits into the recessed track of the arm. The on/off switch within the recessed track of the arm may be actuated by the protruding track pin 620 of the auxiliary display 240. When the auxiliary display 240 is in a closed position, the track pin 620 may place the on/off switch in an off position that turns off the auxiliary display 240. As the auxiliary display 240 is rotated, the track pin 620 may allow the on/off switch to move into an on position that turns on the auxiliary display 240. When the track pin 620 is placed in a recessed track provided in the arms, the range of motion for the auxiliary display 240 may be defined by the recessed track and the track pin 525.

In other implementations, such as the implementations shown in FIGS. 3B-3E, similar pivot and track configurations may be utilized to allow the auxiliary display 240 to flip up/down and turn the display on/off, respectively. The protruding and recessed pivots, the protruding track pins, and the recessed tracks may be placed on the portable IHS 200, the pivot arms 350, and/or the auxiliary display 240. In some implementations, placement of the recessed tracks and track pins or the protruding pivot and recessed pivot may be switched. For instance, the recessed pivots and the recessed track may be placed on the cover of the portable IHS 200 while the protruding pivot and protruding track pin may be placed on the arms coupled to the auxiliary display 240. The protruding/recessed pivot, protruding track pin, recessed track, and on/off switch illustrated in FIG. 46 may provide certain illustrative implementations for purposes of explanation only, thus implementations of an auxiliary display 240 are in no way limited to the particular implementations described.

Figure 7:
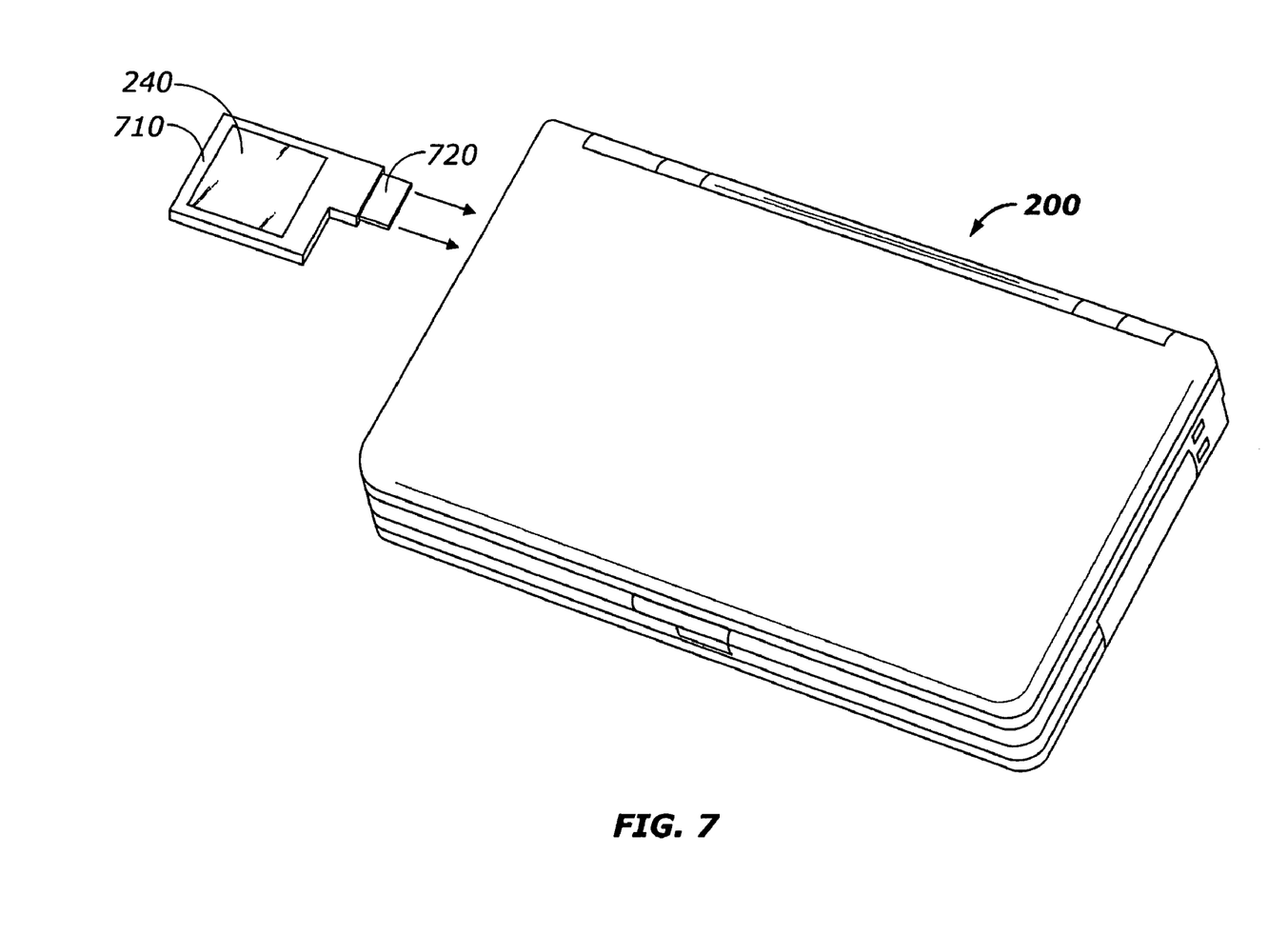
FIG. 7 represents an illustrative implementation of a portable IHS with an express card slot auxiliary display.

FIG. 7 represents an illustrative implementation of a portable IHS 200 with an auxiliary display card. A card, such as an auxiliary display card 710, may be inserted into a slot provided by a portable IHS 200, such as a personal computer memory card international association (PCMCIA) slot, PCI mini card slot, PCI Express Card slot or another suitable slot type. The auxiliary display card 710 may include an auxiliary display 240, a connector 720, a processor, memory, a battery, and the like. A low power general purpose processor may be implemented to facilitate an embedded application and memory data management of the portable IHS. The connector 720 senses when the auxiliary display card 710 is docked within the portable IHS 200 and while docked, the battery may charge the auxiliary display card 710. Data may also be transferred to a memory provided in the auxiliary display card 710 when docked. When the auxiliary display card 710 is removed or undocked from the portable IHS 200, the auxiliary display card 710 assumes an operational state and may be viewed. When the auxiliary display card 710 is removed from the portable IHS 200, it may communicate with the portable IHS 200 utilizing RF signals, IR signals, Bluetooth, Wi-Fi, or the like. The auxiliary display card 710 may be powered on and off through the use of a key (not shown) on the card 710. Alternatively, a hot key plug detect from a pin (not shown) on the connector 720 may sense whether the auxiliary display card 710 is docked or undocked, thereby powering the card 710 on and off.

The implementations discussed herein utilizing an auxiliary display integrated into and/or coupled to the cover or another location on the laptop may allow a user to access information (e.g., emails, calendars, contacts) when the laptop is in a standby/hibernation mode or in a closed position. Thus, the use of an auxiliary display may improve overall customer experience by providing versatility in the operation of a laptop, particularly during circumstances whereby privacy and discrete use are required by a user.

Various methods are contemplated including all or less than all of the steps described herein and/or mentioned above, any number of repeats or any of the steps shown and/or mentioned above, and performance of the steps in any order.

Particular embodiments and/or implementations of the present disclosure have been described in detail. However, the present disclosure is not limited to these embodiments and/or implementations, and it is understood by one skilled in the art that various other embodiments and/or implementations are possible within the scope of the present disclosure. For example, it should also be understood that although two flexing arms are shown in FIG. 3C and described as such for purposes of illustration only, an auxiliary display may be coupled to one or any number of arms. Also, while the auxiliary display is shown in FIGS. 3A-3E to be substantially rectangular in shape, the auxiliary display may take the form of any suitable shape such as square or the like.

Thus, modifications and variations may be made without departing from the spirit and scope of the claimed subject matter in the present disclosure. Such changes in form and detail, including use of equivalent functional and/or structural substitutes for elements described herein, fall within the scope of the appended claims and are intended to be covered by this disclosure.

What is claimed is:

1. A portable information handling system (IHS), the system comprising:

a cover;

a primary display disposed on the cover;

an auxiliary display coupled to the cover, wherein the auxiliary display is movable between a viewable position and a closed position; and a switch coupled to the auxiliary display, wherein the switch is adapted to place the auxiliary display in an operational state in the viewable position and in an non-operational state in the closed position.

2. The system of claim 1 further comprising:

at least one arm coupling the auxiliary display to the cover, wherein the at least one arm is adapted to rotate the auxiliary display between the closed position and the viewable position.

3. The system of claim 2 further comprising:
a first arm coupled to a first edge of the auxiliary display; and
a second arm coupled to a second edge of the auxiliary display opposite the first edge, wherein the auxiliary display is adapted to rotate about an axis parallel to the cover.

4. The system of claim 1, wherein the cover forms a display slot into which the auxiliary display is inserted.

5. The system of claim 4, wherein the auxiliary display is in the operational state when facing upward in the display slot and in the non-operational state when facing downward in the display slot.

6. The system of claim 1, wherein the auxiliary display is disposed on a card detachable from the portable IHS.

7. The system of claim 6, wherein the auxiliary display is configured to be coupled to a port selected from personal computer memory card international association (PCMCIA), universal serial bus (USB), personal computer (PC) card and Express card.

8. The system of claim 6, wherein the auxiliary display is communicatively coupled to the information handling system via signals selected from Bluetooth, infrared (IR), radio frequency (RF) and Wi-Fi.

9. The system of claim 6 further comprising:
a rechargeable battery to provide power to the card when coupled to the portable IHS.

10. The system of claim 1, wherein the auxiliary display comprises a thin film transistor-liquid crystal display (TFT-LCD), an organic light emitting diode (OLED) display or an electronic ink (E-Ink) display.

11. A card for displaying data on a portable information handling system (IHS), the card comprising:
an auxiliary display disposed on the card, wherein the auxiliary display assumes an operational state when uncoupled from the IHS;
a connector on one end of the card, wherein the connector is adapted to couple the card to the portable IHS; and
a processor coupled to the display, wherein the processor manages data received by the card.

12. The card of claim 11, wherein the card receives power provided by a rechargeable battery when the card is coupled to the portable IHS.

13. The system of claim 11, wherein the connector is a type selected from personal computer memory card international association (PCMCIA), universal serial bus (USB), personal computer (PC) card and Express card.

14. The system of claim 11, wherein the auxiliary display is communicatively coupled to the portable IHS via signals selected from Bluetooth, infrared (IR), radio frequency (RF) and Wi-Fi when the card is detached from the portable IHS.

15. The system of claim 11, wherein the auxiliary display comprises thin film transistor-liquid crystal display (TFT-LCD), an organic light emitting diode (OLED) display or an electronic ink (E-Ink) display.

16. A method for providing data on an auxiliary display of a portable information handling system (IHS), the method comprising:
providing the portable IHS comprising a cover, and a primary display disposed on the cover;
coupling the auxiliary display to the portable IHS, wherein the auxiliary display is movable between a viewable position and a closed position; and
providing a switch coupled to the auxiliary display, wherein the switch is adapted to place the auxiliary display in an operational state in the viewable position and in a non-operational state in the closed position.

17. The method of claim 16 further comprising:
providing a display slot on a cover of the portable IHS, wherein the display slot is adapted to receive the auxiliary display.

18. The method of claim 16, further comprising:
providing at least one arm coupling the auxiliary display to the cover, wherein the at least one arm is adapted to rotate the auxiliary display between a closed position and a viewable position.

19. The method of claim 16, wherein the auxiliary display is configured to be coupled to a port type selected from personal computer memory card international association (PCMCIA), universal serial bus (USB), personal computer (PC) card and Express card.

20. The method of claim 16, wherein the auxiliary display is communicatively coupled to the portable IHS via a signal type selected from Bluetooth, infrared (IR), radio frequency (RF) and Wi-Fi.

21. The method of claim 16, wherein the auxiliary display is disposed on a card detachable from the portable IHS and the card is powered by a rechargeable battery when the card is coupled to the portable IHS.

* * * * *